United States Patent [19]
Morelli

[11] Patent Number: 5,454,413
[45] Date of Patent: Oct. 3, 1995

[54] AUTOMOBILE TRACTION ENHANCEMENT DEVICE

[76] Inventor: Richard L. Morelli, 7141 Aitken Rd., Lexington, Mich. 48450

[21] Appl. No.: 260,260

[22] Filed: Jun. 14, 1994

[51] Int. Cl.$^6$ .................................................. B60C 27/06
[52] U.S. Cl. ................. 152/225 C; 152/225 R; 152/187; 152/191
[58] Field of Search ................... 152/208, 183, 152/225 C, 225 R, 221, 222, 191, 187, 185.1, 179

[56] References Cited

U.S. PATENT DOCUMENTS

| | | | |
|---|---|---|---|
| 1,314,946 | 9/1919 | Champion | 152/183 |
| 1,399,612 | 12/1921 | Gosney | 152/183 |
| 1,525,977 | 2/1925 | Biver | 152/227 |
| 2,058,192 | 10/1936 | Turulis | 152/225 C X |
| 2,437,040 | 3/1948 | Prevost et al. | 152/225 C X |
| 2,530,108 | 11/1950 | Whichard, Sr. et al. | 152/225 C X |
| 2,754,873 | 7/1956 | Willis | 152/183 |
| 2,808,868 | 10/1957 | Bryan | 152/228 |
| 2,867,259 | 1/1959 | Barron | 152/225 C |
| 2,882,949 | 4/1959 | Del Vecchio | 152/208 X |
| 3,323,572 | 6/1967 | Farah | 152/208 |

*Primary Examiner*—Michael W. Ball
*Assistant Examiner*—Francis J. Lorin

[57] ABSTRACT

An automobile traction enhancement device including a detachable continuous track disposed circumferentially around an automobile road tire. The track comprises a strong, flexible, matlike material having a plurality of evenly spaced U-shaped cleats and bars attached across the underlying tire tread area. The automobile traction enhancement device configured as an elongated strip having the bars and a portion of the cleats facing a road surface is first positioned in a driving path of a driven road wheel and the automobile is driven thereon. The device is then wrapped around the tire tread portion and interjoined by a pin which is inserted through holes in the track ends thereby linking the ends for use. The cleat sides engage the road wheel sidewalls thereby precluding side slippage from the wheel. The bars and a portion of the cleats engage the roadway thereby providing traction in snow and ice surface conditions.

1 Claim, 5 Drawing Sheets

AUTOMOBILE TRACTION ENHANCEMENT DEVICE

BACKGROUND OF THE INVENTION

1. Field of the Invention

The present invention relates to automobile traction enhancement devices and more particularly pertains to an automobile traction enhancement device which may be employed to enhance roadwheel traction under snow or ice roadway surface conditions.

2. Description of the Prior Art

The use of automobile traction enhancement devices is known in the prior art. More specifically, automobile traction enhancement devices heretofore devised and utilized for improving roadwheel traction under snowy and icy road conditions are known to consist basically of familiar, expected and obvious structural configurations, notwithstanding the myriad of designs encompassed by the crowded prior art which have been developed for the fulfillment of countless objectives and requirements.

The present invention is directed to improving devices for an automobile traction enhancement device in a manner which is safe, secure, economical and aesthetically pleasing.

For example, U.S. Pat. No. 4,513,801 to Pedrick et al. discloses band grips comprising a band of flexible material having a plurality of roadway gripping outer deformations and a worm-gear hose clamp type securing device. The Pedrick et al. invention has no interconnection of a plurality of band grips circumferentially disposed upon a road wheel tread portion and is furthermore only applicable to road wheels having perforated road wheels permitting passage of a banding portion of the band grip therethrough. The present invention provides an interconnected series of enlarged road gripping members disposed upon a continuous belt member upon the tread surface of a road wheel. And furthermore the present invention is applicable to road wheels having no perforations therethrough.

In U.S. Pat. No. 5,178,700 to Akitsu et al. non-skid devices for tires is disclosed. The Akitsu invention comprises a net like tire chain body having metal shanks with ceramic spikes affixed thereon. The present invention employs barlike cross members engaging a significantly greater portion of the road surface when compared to the small ceramic spikes and shanks of the Akitsu et al. invention and furthermore the increased engagement provides substantially improved traction under slippery conditions.

In U.S. Pat. No. 4,749,015 to Miyagawa a non-skid device for tires is described comprising two parallel cable-like members having a plurality of resilient straplike non-skid members disposed therebetween and furthermore the non-skid members are disposed circumferentially upon the tread portion of an automobile road wheel thereby enhancing traction thereof. The present invention employs a continuous belting around the road wheel and further provides a series of rigid barlike members which engage the road surface thereby providing a significant improvement in tractor ability when so applied.

In U.S. Pat. No. 4,321,956 to Martinelli a belt attachment for tire chains is disclosed for improving traction of automobile tires. The Martinelli invention comprises a plurality of wire rope segments disposed across the tread of the tire and being affixed thereon by a pair of lateral cables with a tensioning device. A disadvantage in this prior art lies in a lack of a continuous belt having rigid roadway engagement devices disposed thereon and as a result the wire rope segments will move to a less favorable position on the tire when the tire begins to slip on an icy or snowy surface. The present invention comprises a plurality of equally spaced barlike roadway engagement members affixed to a beltlike member disposed upon the tire tread wherein a plurality of the roadway engagement members are formed into U-shaped parts wherein the legs of the U-shaped parts engage the tire sidewall to maintain attachment thereon.

U.S. Pat. No. 4,825,923 to Blankenship et al. discloses a traction cable comprising a plurality of cross cablelike traction enhancement devices affixed to a pair of lateral cables each having a tensioning device disposed therein. The disclosure teaches a plurality of helically wound members loosely engaging cross cables thereby forming the traction enhancement devices. The disclosure makes no provision for disposition of barlike traction enhancement devices upon a beltlike member. A further disadvantage is the susceptibility of the helically wound members to rotation about the cross cable thereby reducing traction significantly. Furthermore, there are no provisions for positively maintaining the entire group of traction enhancement devices upon the road wheel. The present invention comprises a beltlike member having a plurality of evenly spaced barlike traction enhancement devices disposed thereon and furthermore a quantity of the traction enhancement devices are formed into U-shapes wherein the legs of the U engage the wheel sidewall thereby maintaining the beltlike member upon the wheel tread portion.

In this respect, the automobile traction enhancement device according to the present invention substantially departs from the conventional concepts and designs of the prior art, and in so doing provides an apparatus primarily developed for the purpose of enhancing the traction of an automobile road wheel during conditions of lowered frictional relationships such as experienced when roads are snow or ice covered.

Therefore, it can be appreciated that there exists a continuing need for new and improved automobile traction enhancement device which can be detachably applied to one or more automobile road wheels thereby improving wheel-road frictional engagement. In this regard, the present invention substantially fulfills this need.

As illustrated by the background art, efforts are continuously being made in an attempt to improve automobile traction under slippery driving conditions. No prior effort, however, provides the benefits attendant with the present invention. Additionally, the prior patents and commercial techniques do not suggest the present inventive combination of component elements arranged and configured as disclosed and claimed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

In view of the foregoing disadvantages inherent in the known types of automobile traction enhancement devices now present in the prior art, the present invention provides an improved automobile traction enhancement device construction wherein the same can be utilized for enhancing the tractor capabilities of driven automobile road wheels in snow or ice covered road conditions. As such, the general purpose of the present invention, which will be described subsequently in greater detail, is to provide a new and improved automobile traction enhancement device apparatus and method which has all the advantages of the prior art traction enhancement devices and none of the disadvantages.

The invention is defined by the appended claims with the specific embodiment shown in the attached drawings. For the purpose of summarizing the invention, the invention may be incorporated into an elongated, strong, flexible belt having a means for detachably joining the ends thereof using a pin member. The belt has a series of U-shaped cleats and elongated bars attached at even intervals thereon. The U-shaped cleats and bars engage a potentially slippery road surface thereby providing positive engagement with the road wheel and a consequent improvement of traction. The U-shaped cleats engage the side portion of a road wheel thereby retaining the automobile traction enhancement device.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide an improved automobile traction enhancement device having a series of elongated gripping members in a continuous array disposed upon the circumference of an automobile road tire.

It is therefore an additional object of the present invention to provide a new and improved automobile traction enhancement device which has all the advantages of the prior art automobile traction enhancement devices and none of the disadvantages.

It is another object of the present invention to provide a new and improved automobile traction enhancement device which may be easily and efficiently manufactured and marketed.

It is a further object of the present invention to provide a new and improved automobile traction enhancement device which is of a durable and reliable construction.

An even further object of the present invention is to provide a new and improved automobile traction enhancement device which is susceptible of a low cost of manufacture with regard to both materials and labor, and which accordingly is then susceptible of low prices of sale to the consuming public, thereby making such automobile traction enhancement devices economically available to the buying public.

Still yet another object of the present invention is to provide a new and improved automobile traction enhancement device which provides in the apparatuses and methods of the prior art some of the advantages thereof, while simultaneously overcoming some of the disadvantages normally associated therewith.

Still another object of the present invention is to provide a new and improved automobile traction enhancement device employing a lightweight beltlike member attaching circumferentially upon an automobile road tire.

Yet another object of the present invention is to provide a new and improved automobile traction enhancement device having a plurality of metallic or plastic U-shaped cleats and a plurality of barlike members riveted to a strong continuous belt formed circumferentially upon an automobile road wheel.

Even still another object of the present invention is to provide a new and improved automobile traction enhancement device detachably affixed to an automobile road tire using a singular pin member.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention. The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
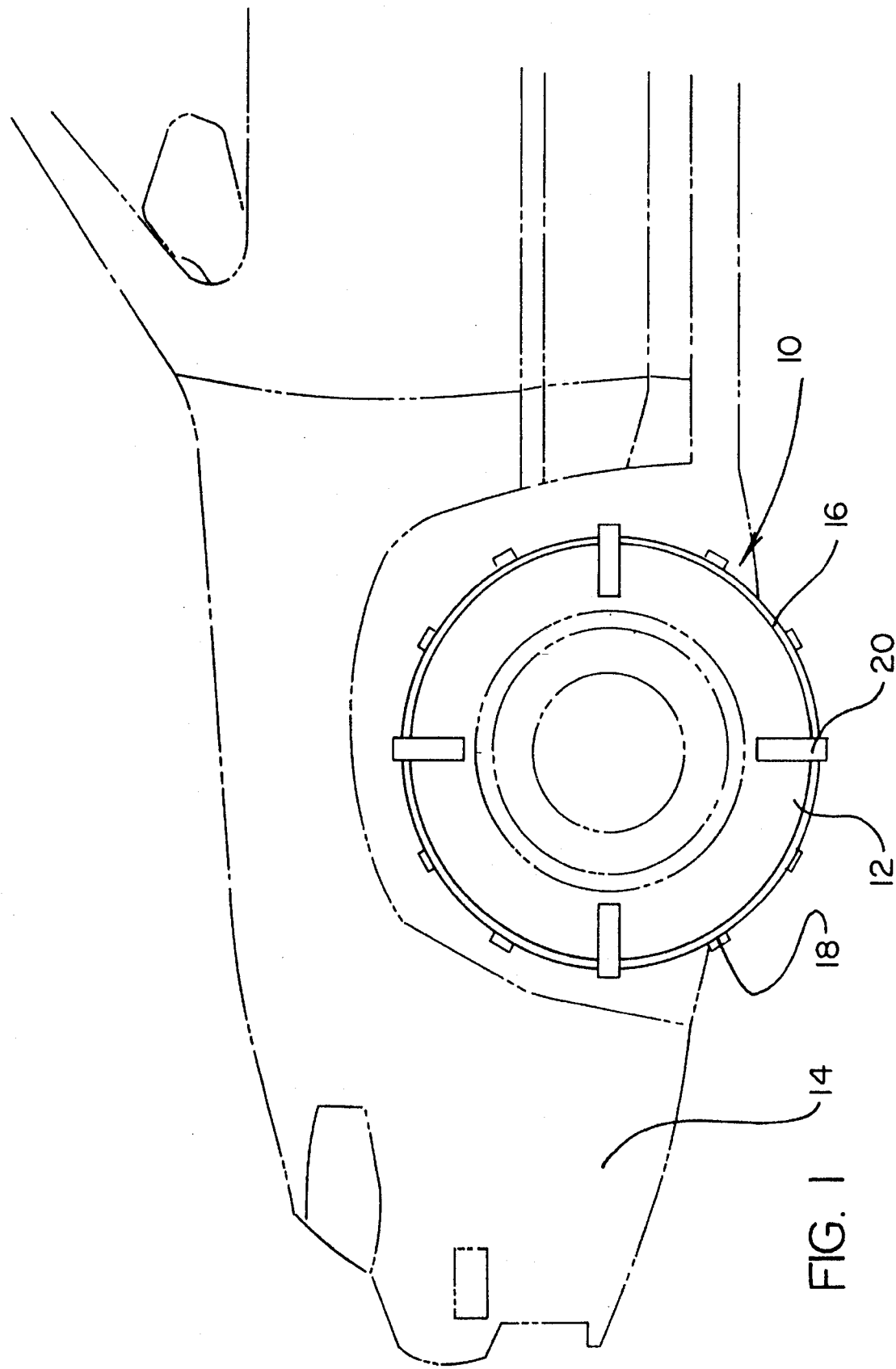
FIG. 1 is a side elevational view of the automobile traction enhancement device showing an operational disposition thereof.

With reference now to the drawings, and in particular to FIG. 1 thereof, a new and improved automobile traction enhancement device embodying the principles and concepts of the present invention and generally designated by the reference numeral 10 will be described.

From an overview standpoint, the automobile traction enhancement device is adapted for use with a road wheel 12 of an automobile 14 for the purpose of improving road surface engagement thereof. See FIG. 1. The automobile traction enhancement device 10 comprises a beltlike member 16 having a plurality of barlike members 18 and U-shaped cleats 20 circumferentially disposed upon road wheel 12. Barlike members 18 and cleats 20 rotate with road wheel 12 and engage the road surface and U-shaped cleats 20 additionally engage the road wheel 12 thereby maintaining the automobile traction enhancement device 10 upon the road wheel tread portion. In use, the automobile traction enhancement device 10 is laid upon a road surface and automobile 14 is repositioned disposing a driven roadwheel 12 centrally thereupon. The automobile traction enhancement device 10 is then repositioned circumferentially around wheel 12 and fastened thereon.

Figure 2:
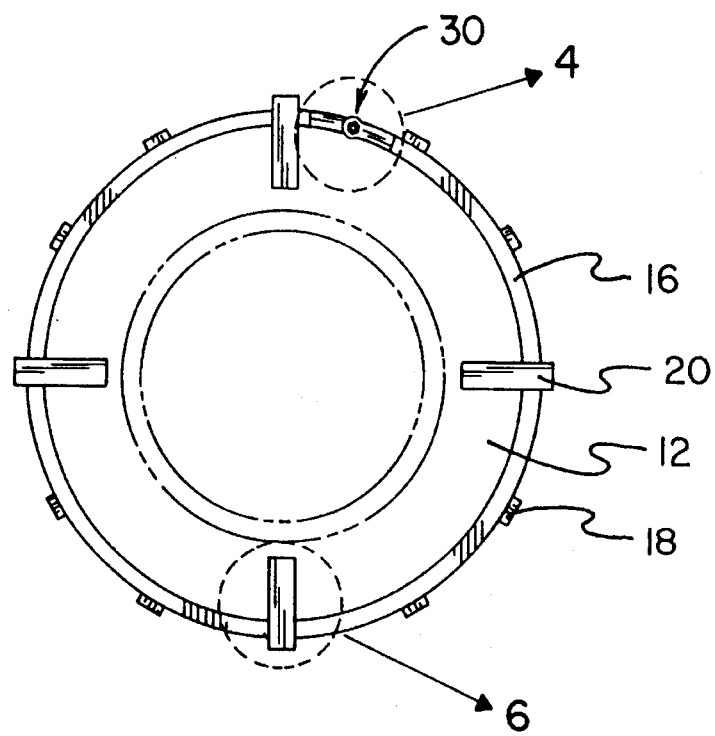
FIG. 2 is a side elevational view of the automobile traction enhancement device in a wheel mounted position.
Figure 3:
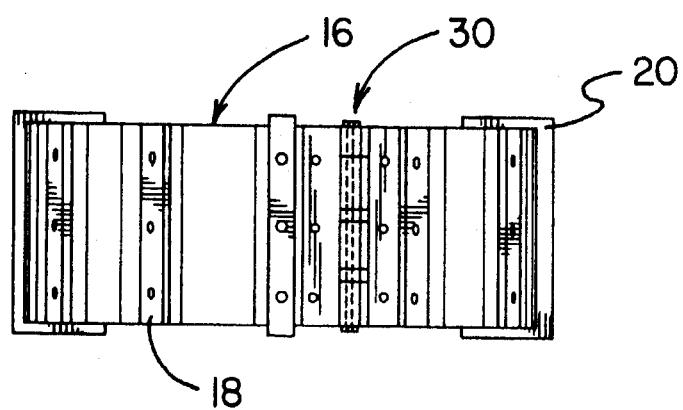
FIG. 3 is side elevational view of the automobile traction enhancement device showing the enhanced wheel tread formed thereby.

More specifically, it will be noted that the automobile traction enhancement device 10 comprises a flexible beltlike member 16 having a plurality of barlike members 18 and cleats 20 disposed thereon and furthermore has a detachable pivoting joint 30 providing a means for attachment and removal from the road wheel 12. See FIG. 2. Flexible beltlike member 16 comprises an elongated strap of three eights inch nominal thickness and of fiber reinforced rubber composition. The width of beltlike member 16 is sufficient to substantially cover a tread area of road wheel 12. See FIG. 3. Beltlike member 16 is necessarily strong and substantially impervious to frictional interactions with the road surface. Alternatively, the flexible beltlike member 16 comprises a series of flexible elongated members pivotably interconnected at free ends thereof by a plurality of pin members.

Figure 4:
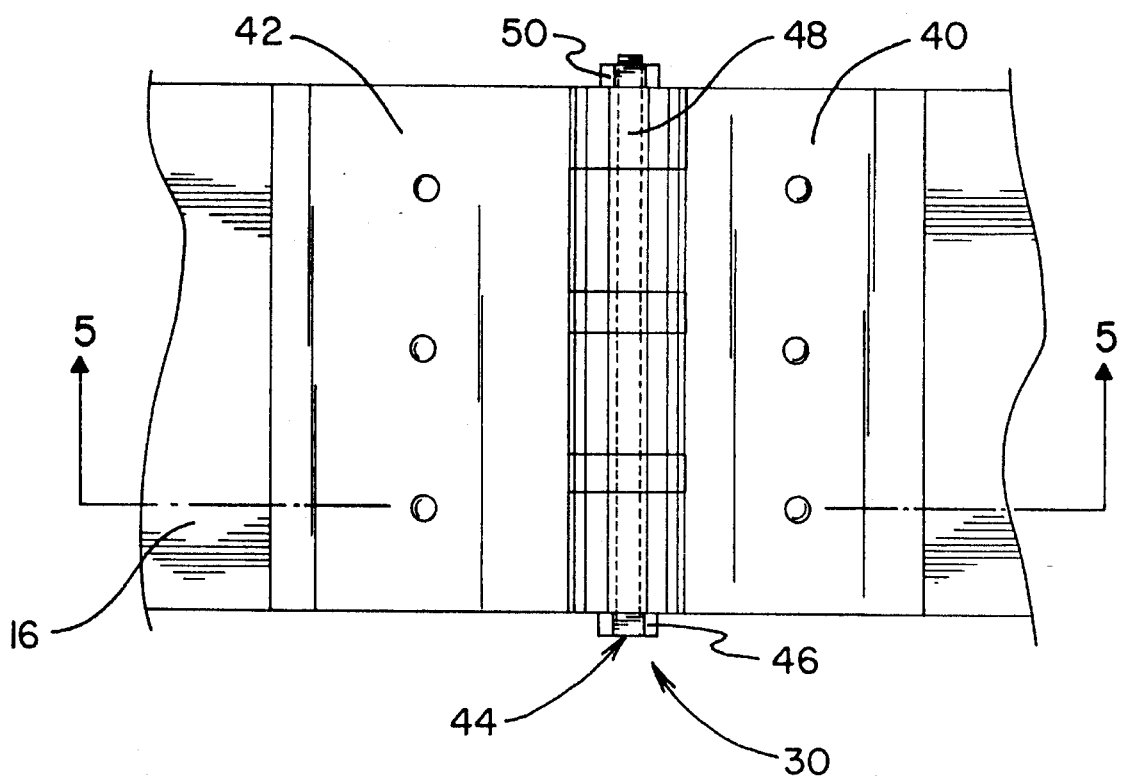
FIG. 4 is a fragmentary side elevational view of the automobile traction enhancement device showing a pinlike attachment means.
Figure 5:
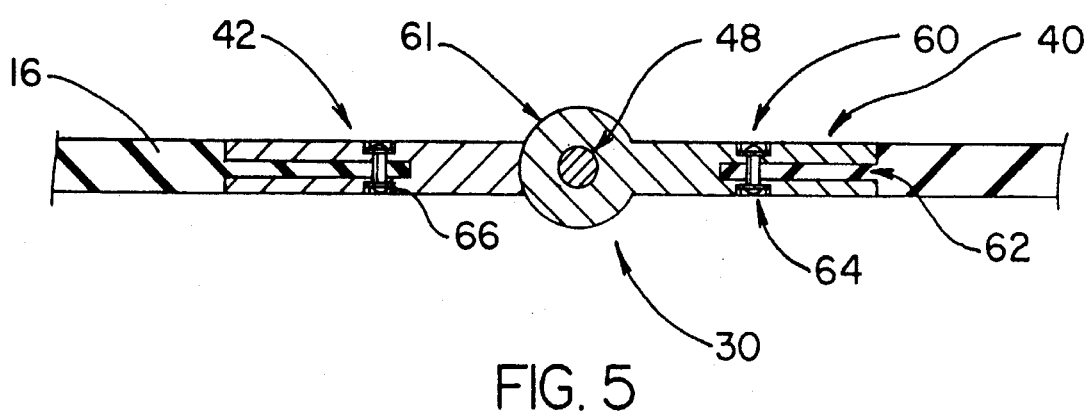
FIG. 5 is a fragmentary sectional view of a automobile traction enhancement device taken substantially upon the plane indicated by the section line 5—5 of FIG. 4.

Detachable pivoting joint 30 comprises a first hinge member 40, a second hinge member 42, and a removable pin member 44. See FIG. 4. Removable pin member 44 comprises an elongated bolt having a head 46, a shank 48, and a nut 50. Head 46 comprises a hexagonal or other shape internally or externally engaging an installation tool. A portion of shank 48 has threads formed thereon which engage internal threads of nut 50. Alternately, a lock pin may be employed in place of a nut to fasten pin member 44 to the flexible beltlike member 16. Employment of a lock pin requires boring a through hole orthogonally to the pin member 44 axis an end opposite the head 46. First hinge member 40 comprises a flat portion 60 and an enlarged pivotal portion 61. See FIG. 5. Flat portion 60 has a deep groove 62 disposed within a narrow edge therein. Deep groove 62 engages a thinned tongue of flexible beltlike member 16 and is further fastened thereupon by rivets 64. Rivets 64 are disposed within doubly countersunk through holes 66 thereby mitigating road surface engagement induced wear thereof. Enlarged pivotal portion 61 comprises a segmented cylinder having an axially disposed through hole disposed therein. Second hinge member 42 is substantially identical to first hinge member 40 in shape and form howsoever the pivotal portion 61 of first hinge member 40 and a similar pivotal portion of second hinge member 42 may differ in segment length provided that the resulting segmentation permits interleaving engagement of various segments of first and second hinge members.

Figure 6:
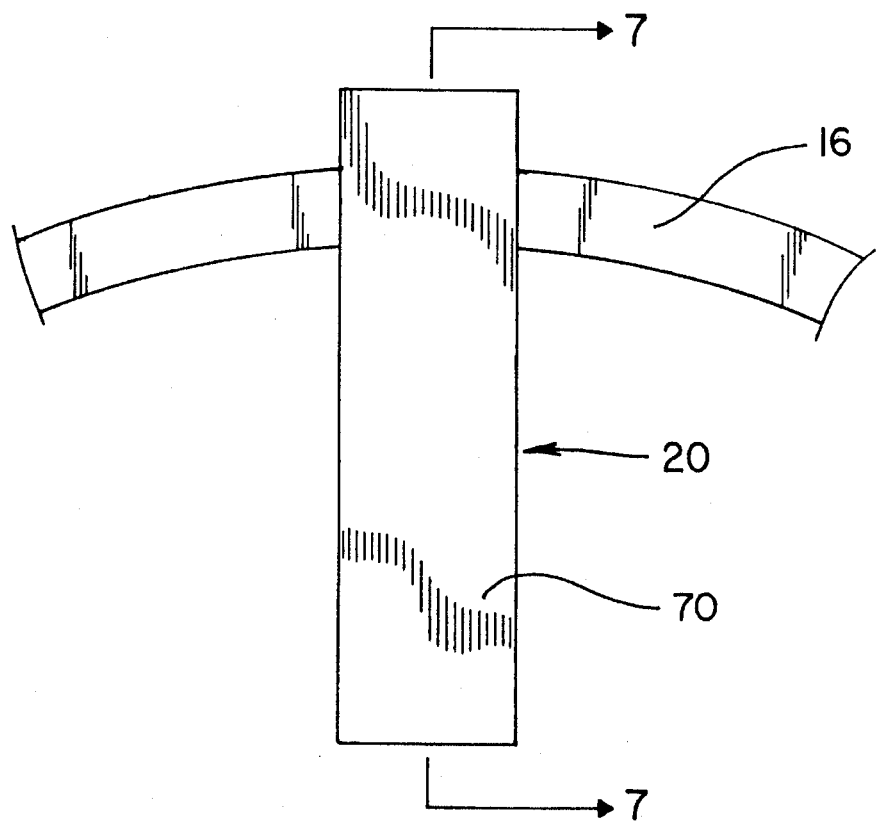
FIG. 6 is a fragmentary side elevational view of a automobile traction enhancement device showing a cleat member.
Figure 7:
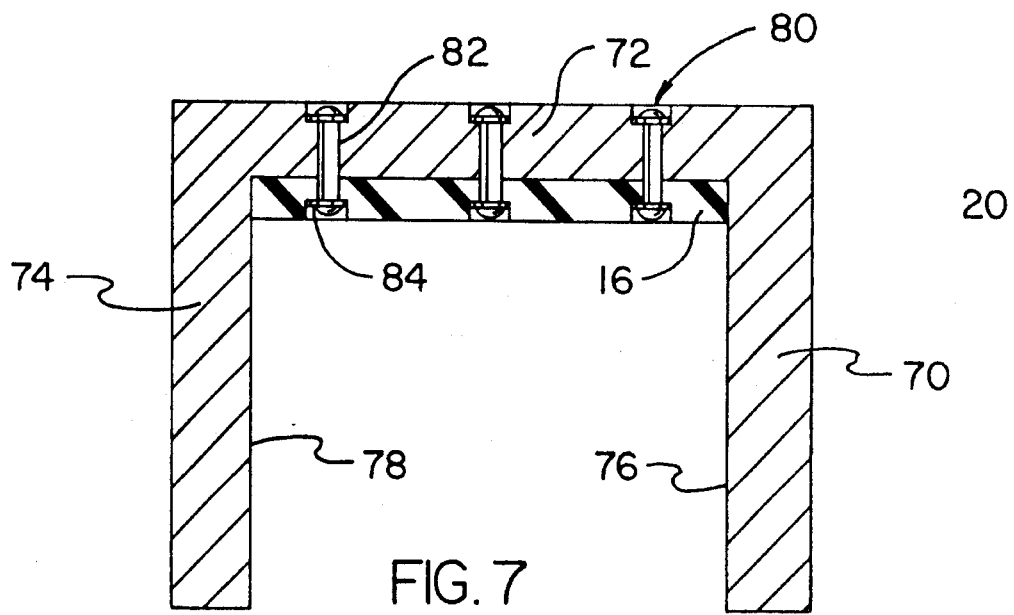
FIG. 7 is a side sectional view of the automobile traction enhancement device taken substantially upon the plane indicated by the section line 7—7 of FIG. 6.

U-shaped cleat 20 comprises a first side portion 70, a central portion 72, and a second side portion 74. See FIGS. 6 and 7. U-shaped cleat is of steel or rugged plastic construction and may have decorative or textures applied to various surfaces thereof. First side portion 70 is orthogonally disposed upon central portion 72 and furthermore engages road wheel 12 at inside surface 76. Second side portion 74 is orthogonally disposed upon central portion 72 and furthermore engages road wheel 12 at inside surface 78. A plurality of rivets 80 are employed to fasten U-shaped cleat 20 to beltlike member 16. Rivets 80 are disposed through doubly counterbored through holes 82 penetrating both central portion 72 and beltlike member 16. Washer 84 may be employed to engage rivet 80 and enhance the fastening ability of this and any other rivet employed in the automobile traction enhancement device 10. Central portion 72 has a free inside dimension substantially equivalent to the width beltlike member 16 disposed therein. Alternately first side portion 70 and second side portion 74 are angularly disposed with respect to central portion 72 in a manner wherein a distance between free ends of first and second side portions 70 and 74 is greater than a similar distance measured in close proximity to central portion 72.

Figure 8:
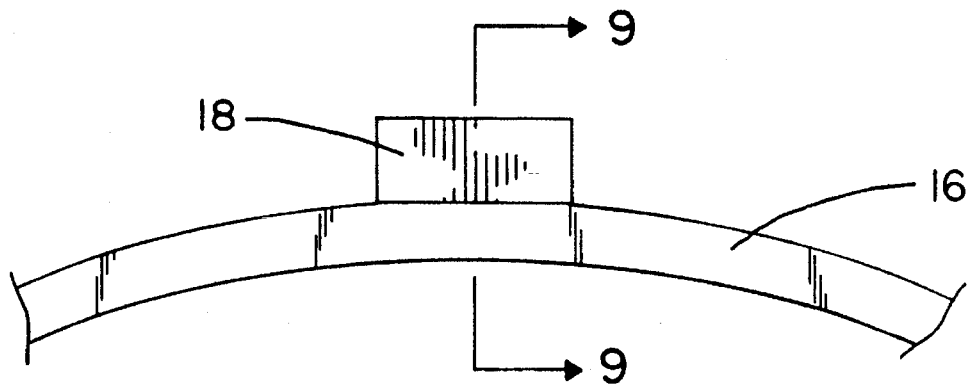
FIG. 8 is a fragmentary perspective view of an automobile traction enhancement device showing a traction only cleat member.
Figure 9:
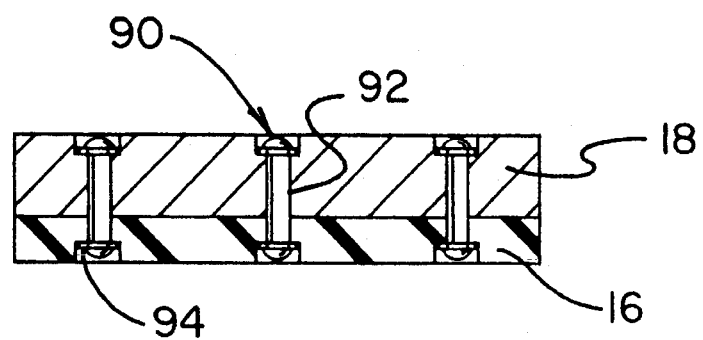
FIG. 9 is a side sectional view of an automobile traction enhancement device taken substantially upon the plane indicated by the section line 9—9 of FIG. 8.

Barlike members 18 comprise a hard rigid material such as steel or some rugged forms of plastics included fiber strengthened polymers extending across the flexible beltlike member 16. See FIGS. 8 and 9. Barlike member 18 is fastened to beltlike member 16 using a plurality of rivets 90. Rivets 90 are disposed within doubly countersunk through holes 92 and may include washers 94 for enhanced holding ability. Barlike members 18 extend substantially the width of the roadwheel 12 tread portion which is substantially equivalent to the width of beltlike member 16. Barlike members 18 may comprise an elongated U-shaped channel having the free ends of the U shape engaging the operational roadway. Barlike members 18 are disposed substantially perpendicularly to an elongated edge of the beltlike member 16. Or the bar members may be disposed at a fixed or varied angular relationship to the elongated edge of the beltlike member 16 wherein preference is given to an alternating application of angular disposition thereby providing lateral force components to the automobile 14 which aid in maintaining a vehicle path in a substantially straight line. Additionally, alternatingly angularly disposed barlike members 18 improve control of the automobile 14 by mitigating potential sliding of the automobile in the direction of a parallely disposed barlike member 18 while retaining a substantial degree of traction.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

What is claimed as being new and desired to be protected by Letters Patent of the United States is as follows:

1. A new and improved automobile traction enhancement device for improving the traction of an automobile road wheel under slippery road conditions as produced by ice or snow cover comprising:

an elongated beltlike member susceptible to circumferential disposition upon the outer portion of an automobile road wheel;

a detachable fastening means for joining two free ends of said beltlike member when disposed upon said automobile road wheel, the detachable fastening means comprising a first hinge member, a second hinge member, and a removable pin member, the removable pin member comprising a head, a shank, and a nut, the head comprising a hexagonal shape internally or externally engaging an installation tool, a portion of the shank having threads formed thereon which engage internal threads of the nuts, the first hinge member comprising a flat portion and an enlarged pivotal portion, the flat portion having a deep groove disposed within a narrow edge therein, the deep groove engaging a thinned tongue of the beltlike member and further fastened thereupon by rivets, the rivets being disposed within doubly countersunk through holes thereby mitigating road surface engagement induced wear thereof, the enlarged pivotal portion comprising a segmented cylinder having an axially disposed through hole disposed therein, the second hinge member being substantially identical to the first hinge member and a similar pivotal portion of the second hinge member differing in segment length;

a plurality of barlike members affixed to said beltlike member upon a side thereof away from said automobile road wheel; and a plurality of U-shaped members having a first side portion, a central portion, and a second side portion, the first side portion being orthogonally disposed upon the central portion and furthermore engaging the road wheel at an inside surface thereof, a plurality of rivets being employed to fasten the U-shaped members to the beltlike member, the rivets being disposed through doubly counterbored through holes penetrating both the central portion and the beltlike member, the central portion having a free inside dimension substantially equivalent to a width of the beltlike member disposed therein.

* * * * *